Dec. 18, 1962 B. A. WORSWICK 3,068,694
MEANS FOR MONITORING A FLOW OF SOLID MATTER IN DIVIDED FORM
Filed Oct. 30, 1958 4 Sheets-Sheet 1
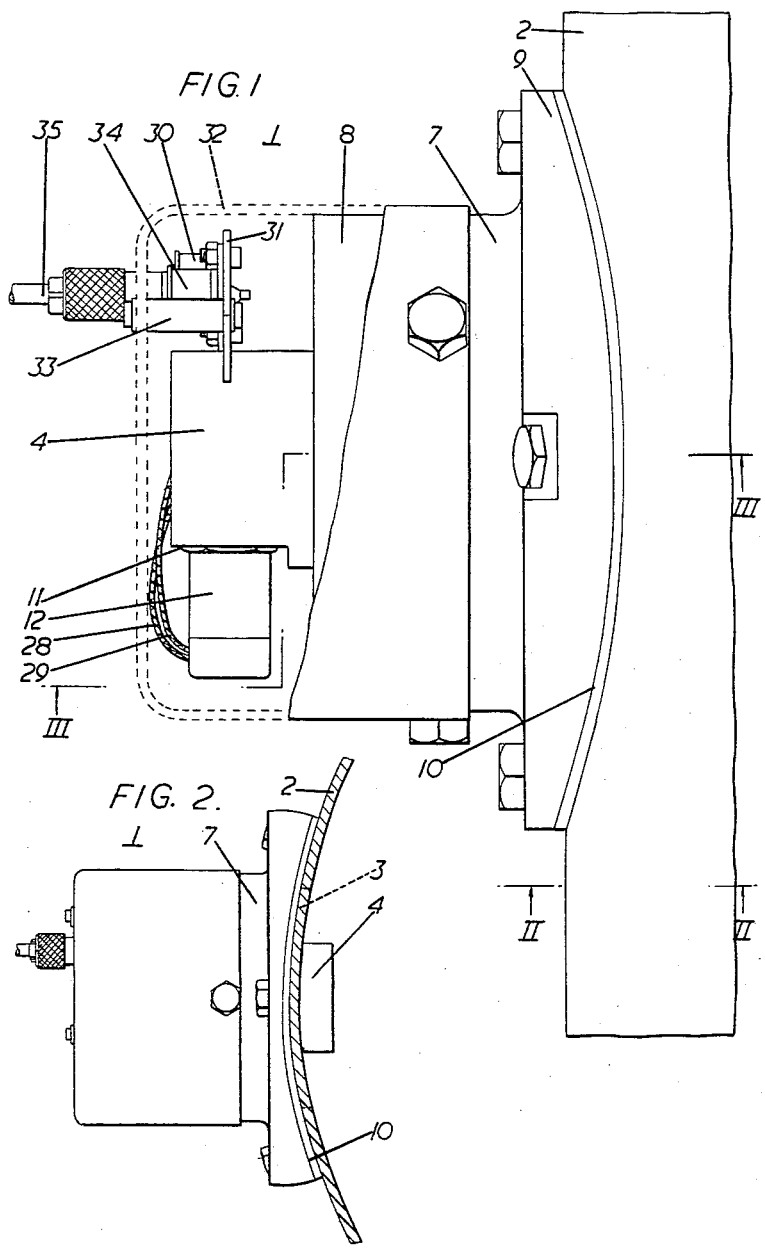
INVENTOR
BERNARD A. WORSWICK
BY
ATTORNEY

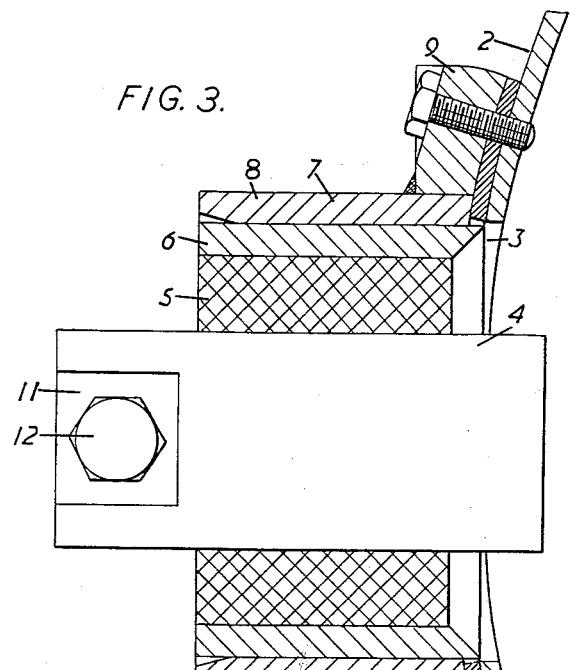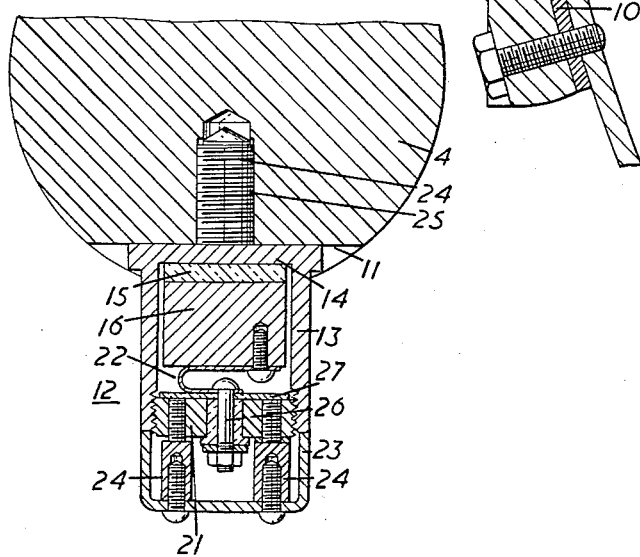

Dec. 18, 1962  B. A. WORSWICK  3,068,694
MEANS FOR MONITORING A FLOW OF SOLID MATTER IN DIVIDED FORM
Filed Oct. 30, 1958  4 Sheets-Sheet 3
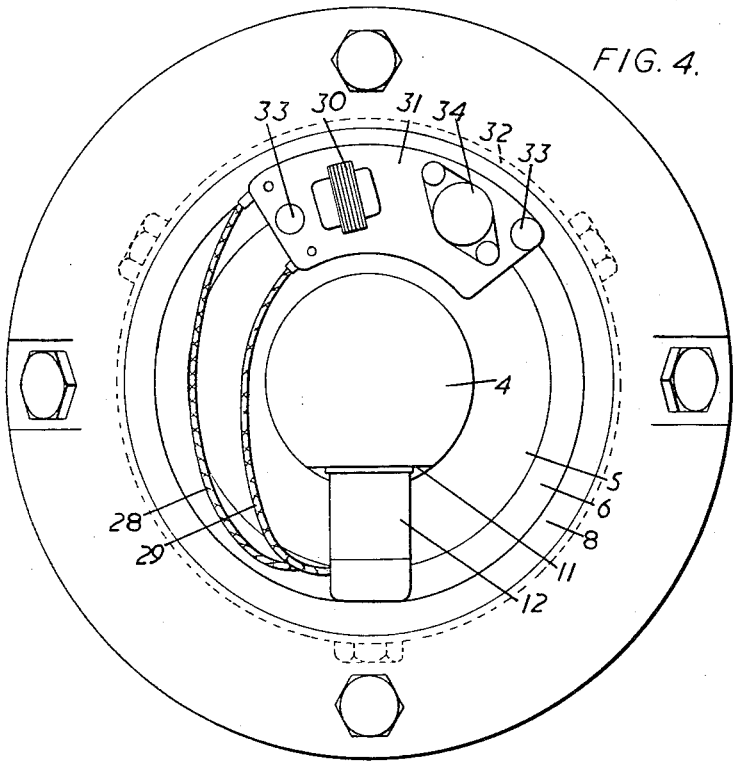
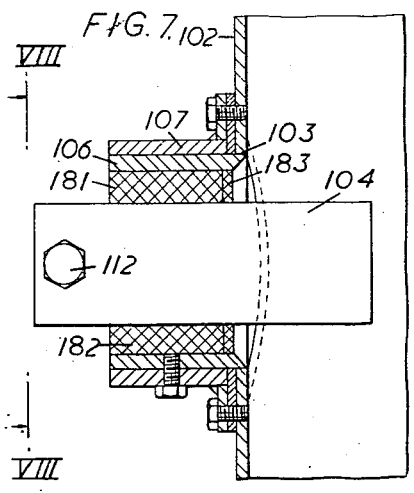
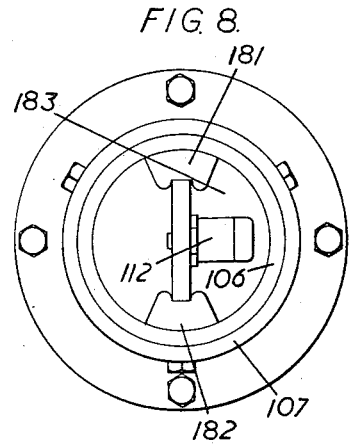
INVENTOR
BERNARD A. WORSWICK
BY
John F. Luhrs
ATTORNEY

United States Patent Office 3,068,694
Patented Dec. 18, 1962

3,068,694
MEANS FOR MONITORING A FLOW OF SOLID MATTER IN DIVIDED FORM
Bernard A. Worswick, Croydon, England, assignor to Bailey Meter Company, Cleveland, Ohio, a corporation of Delaware
Filed Oct. 30, 1958, Ser. No. 770,785
4 Claims. (Cl. 73—194)

This invention relates to means for distinguishing between flow and absence of flow of a stream of solid matter along a flow path and more particularly to improved means for effecting an indication or/and control in the event of failure of flow.

The present invention includes means for distinguishing between flow and absence of flow of a stream of solid matter along a flow path, wherein subject to contact with the stream is a probe element arranged to experience mechanical vibrations under the influence of the flowing stream, a transducer is adapted to convert the mechanical vibrations to electrical vibrations and an electrical relay is responsive to the electrical output of the transducer.

The probe element, the mechanical strength of which and of the mount of which must be adapted to withstand the forces involved, may consist of a round or rectangular bar arranged to project, with its axis transverse to the solids flow, to a greater or less distance into the stream of solid matter, the elements of the stream of solid matter setting the bar into transverse vibrations as a result of scraping past the surface thereof. The strength of the vibrations will vary with the nature of the solid matter of which the flow is to be detected, and other things being equal, with the particle or lump sizes of the solid matter, solid matter of smaller sizing resulting in weaker probe element vibrations than solid matter of the same constitution but of larger sizing; externally originated noises and vibrations may be expected to limit the application of the probe element to detect the movement of solid matter of too small a sizing.

The invention also includes a probe unit adapted for securement to a wall at an aperture therein defining a flow path for a stream of solid matter and adapted to generate electrical vibrations under conditions of flow of the stream, comprising a probe element consisting of a metal bar, mounting means for the bar including a mounting flange adapted to be secured to the wall at said aperture and resilient means contacting the bar only intermediately of its end lengths and adapted for positioning the bar with respect to the mounting flange with its axis transverse to the aperture and its inner end length projecting through the aperture, and an accelerometer type piezo-electric transducer unit mounted on the outer end length of the bar with its axis perpendicular to the bar axis.

This invention also includes means for supplying a stream of coal to a pulverizing mill, including a pipe arranged for the flow of coal therealong under the influence of gravity from a supply hopper to the mill, a probe unit at the wall of the pipe comprising a probe element arranged to experience mechanical vibrations under the influence of the flowing stream, a transducer adapted to convert the mechanical vibrations to electrical vibrations and an electrical relay responsive to the electrical output of the transducer, and electromagnetic vibration means associated with the hopper controlled by the relay and adapted to effect vibrations of the hopper to promote the clearance of blockages in the coal stream from the hopper upon the cessation of response of the probe unit to the flow of coal along the pipe therepast.

The invention will now be described by way of example with reference to the accompanying drawings, in which:

FIGURE 1 is a side elveation of a probe unit mounted on the wall of a vertical pipe, part of a cover being shown only in dotted lines to reveal internal arrangements;

FIGURE 2 is a view of the probe unit as seen from underside from the line II—II of FIGURE 1;

FIGURE 3 is a view from underside of parts of the probe unit as seen in section on the line III—III of FIGURE 1;

FIGURE 4 is an end elevation of the probe unit, the cover being shown in dotted lines only;

FIGURE 5 is a sectional elevation of the probe element and the transducer unit of the probe unit on a plane through the axis of the transducer unit and at right angles to the axis of the probe element;

FIGURE 7 is a side elevation in section through the axis of the probe element of parts of a modification of the probe unit of FIGURES 1 to 5; and FIGURE 8 is an end elevation of the said modification.

Figure 6:
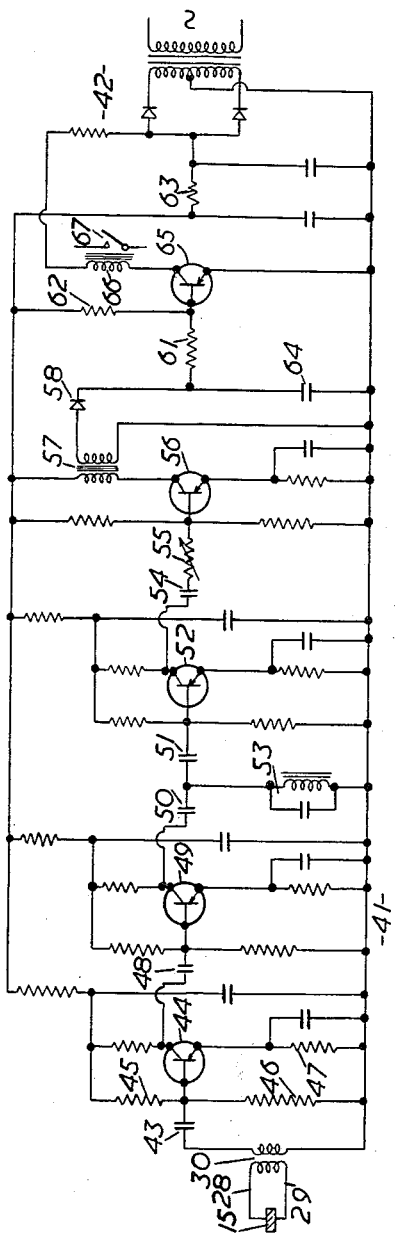
FIGURE 6 is a circuit diagram of electric arrangements adapted to effect operation of an electrical relay in dependence upon the presence or absence of appropriate vibrations in the probe unit.

Referring to the drawings, a probe unit 1 for distinguishing between the flow and the absence of the flow downwardly in a vertical pipe 2 of a stream of crushed coal, consisting of a mixture of dust and lumps up to about 2" cubes, flowing to a pulverizing mill is secured to the wall of the pipe 2 at an aperture 3 therein, and provides a probe element 4 projecting, with its axis transverse to the coal stream direction through the aperture 3 into the space within the pipe.

The probe element 4 consists of a round mild steel bar 4" in length and 1¾" in diameter which is positioned, by a layer or sleeve 5 of tough rubber surrounding the bar except at the respective end lengths of the bar, axially within a mild steel sleeve 6. The mild steel sleeve 6 is held with its axis radial to the pipe by a mounting flange 7 consisting of a sleeve part 8 which surrounds the sleeve 6 and to which the sleeve 6 is attached by screw fixing means, and welded to the sleeve part 8, a flange part 9 secured, with the interposition of a flexible gasket 10, by screw fixing means to the pipe wall around the aperture 3. The inner end length of the probe element projects for ½" into the space within the pipe. The outer end length of the probe element is formed with a flat surface 11, parallel to the axis of the probe element, which provides a seat for a transducer unit 12 adapted to convert mechanical vibrations of the probe element to electrical vibrations.

The transducer unit 12 is of a kind having a cylindrical casing 13, formed with a hexagonally flanged base 14 at one end; a disc 15 with one face in contact with the inner surface of the base 14 and of barium titanate or other suitable piezo-electric crystal; a cylindrical brass inertia mass 16 in contact with the other face of the disc 15; a lid 21 adapted to close the casing by screwing into the end thereof remote from the base; a loop-spring 22 suitably of beryllium copper arranged for urging the inertia mass against the disc 15 and away from the lid 21; and a cover 23 secured to pillars 24 mounted on the lid. The base of the transducer unit is provided with a screw projection 24 extending axially of the transducer unit casing; by turning the transducer unit the screw projection may be advanced into a tapped bore 25 in the probe element extending perpendicularly to the flat surface 11, and the transducer unit may be thus secured to the probe element with the base of the transducer unit firmly bedded against the said flat surface.

It will be understood that upon a vibration of the probe element transverse to its axis and parallel to the axis of the transducer unit, the disc 15 sandwiched between the base of the transducer unit and the inertia mass will generate an alternating E.M.F. across its two faces of the same frequency as that of the vibration. The loop-spring 22 conveys the potential of one face of the disc from the inertia mass to a terminal bolt 26 which projects through the lid 21, is insulated from the lid and pierces an insulating disc 27 between the lid and the loop-spring. A lead 28 from this terminal bolt, and a lead 29 from one of the pillars 24, both leads leaving the transducer unit through an aperture (not shown) in the cover 23, make the generated alternating E.M.F. available at the primary of a matching transformer 30.

The transformer 30 is mounted on a plate 31 of insulating material which is spaced from the inner surface of a cylindrical cover 32, and which is supported from said cover by means of pillars 33. The cover 32 when in position on the probe unit encloses, without making contact therewith, the transducer unit and the outer end length of the probe element to which the transducer unit is secured, and the skirt of the cover is secured by screw fixing means to the sleeve part 8 of the mounting flange 7.

The output of the transformer 30 passes via a socket connection 34 secured to the plate 31 to a co-axial cable 35 which leads the output to a tuned amplifier 41 (FIGURE 6). The electrical connections from the terminals of the leads 28 and 29 to the transformer 30, and from the transformer 30 to the socket connection 34 are made by means of conductive material (not shown) applied to a face of the plate 31.

Referring to FIGURE 6, the amplifier 41 consists of a four-stage junction transistor amplifier fed from an A.C.-supplied rectifier 42. The output of the transformer 30 is led through a capacitor 43 to the base of the first transistor 44, which is stabilized by a potential divider 45, 46 at the input side thereof, and a capacitor-shunted resistor 47 in the emitter circuit thereof. The other three transistors of the amplifier have similar stabilization.

The output from the first transistor 44 is led from the collector thereof via a capacitor 48 to the base of the second transistor 49, the output from which is led from the collector thereof via two capacitors 50, 51 in series to the base of the third transistor 52. A tuned circuit 53, connected between the connection between the two capacitors 50, 51 and the positive terminal of the rectifier 42 provides for the output from the second transistor 49 an alternative path which is taken to an extent which depends upon the frequency of said output. The output from the third transistor 52 is led from the collector thereof via a capacitor 54 and a variable resistor 55 to the base of the fourth transistor 56.

The collector circuit of the fourth transistor 56 includes the primary of a step-up output transformer 57, the output from the secondary of which is half-wave rectified by a rectifier 58. The rectifier 58 is arranged to generate a D.C. voltage positive with respect to the positive terminal of the rectifier 42, and the value of which depends upon the amplitude of the signal input to the amplifier from the transducer unit, which appears amplified across the secondary winding of transformer 57, and upon the values of resistors 61, 62, 63 in series through which current smoothed by a capacitor 64 flows to the negative terminal of the rectifier 42. The connection between the resistors 61 and 62 determines the bias potential of the base of a grounded-emitter, final transistor 65 having in its collector circuit a relay solenoid 66, the current through which determines whether relay contacts 67 are open or closed. The relay contacts 67 are arranged in a suitable circuit (not indicated), the opening or closure of which will effect the operation, in one sense or the other, of a visual or/and audible warning.

The orientation of the probe element 4 with the attached transducer unit 12 is such that the axis of the transducer unit 12 is parallel to the axis of the pipe carrying the coal. In service, with normal flow of coal downwardly along the pipe 2, the coal lumps or particles scraping past the end length of the probe element 4 projecting into the space within the pipe vibrate the probe element transversely. Transverse vibrations of certain frequencies associated with resonance phenomena in the probe element develop the greatest amplitudes of movement in the material of the probe element. Transverse vibrations of the probe element of any frequency at right angles to the flat surface 11 on the probe element are converted by the transducer unit 12 to electrical vibrations of the same frequency. The tuned circuit 53 is arranged to present a path of greatest impedance to electrical oscillations of the frequency of transverse vibrations of greatest amplitude that are set up in the probe element; the amplifier 41 therefore amplifies electrical vibrations of this frequency to the maximum extent while amplifying to lesser extents or attenuating oscillations of other frequencies. The said frequency is that corresponding to the highest of several peaks in the frequency response curve of the probe element, and in the case considered of the detection of crushed coal flow may be about 3 kilocycles per second.

With coal flowing past the probe element, the amplifier 41 provides an output signal which ensures that the base of the final transistor 65 is at a higher potential than the emitter thereof, whereby no current flows through the relay solenoid 66. However, if the supply of coal is exhausted or a blockage is formed at a location either above or below the probe element in the pipe 2 the flow of coal past the probe element ceases, the probe element ceases to vibrate transversely and the amplifier 41 supplies no output signal. After a certain time delay, therefore, depending upon the capacitance of the capacitor 64 and the resistances of the resistors 61, 62 and 63, the bias on the base of the final transistors 65 falls to a value at which enough current flows through the said transistor to operate the relay contacts 67 by reason of the energization of the relay solenoid 66.

It will be appreciated that the time delay serves to prevent normal fluctuations in flow or stoppages of small duration from effecting openings of the relay contacts from the normal closed condition or closing of the relay contacts from the normal open condition.

The layer or sleeve 5 of tough rubber acoustically insulates the probe element from the pipe 2, in which vibrations, not arising from the flow of coal past the probe, but from other causes such as the operation of nearby heavy machinery or the flow of coal at other parts of the pipe, may be predominant. The amplifier 41 by reason of the presence of the tuned circuit 53 rejects electrical vibrations other than those at or near the predetermined frequency of about 3 kilocycles per second, amongst which are included electrical vibrations arising from extraneous noise vibrations which are mostly of lower frequency. Therefore the tuning of the amplifier and the acoustic insulation tend to increase the differentiation between vibrations produced by coal flowing past the probe element, and vibrations due to extraneous causes.

Useful transverse vibrations of the probe element may be picked up by the transducer unit whatever the orientation of the axis of the transducer unit with respect to the direction of solids flow along the pipe, but the described orientation with the transducer unit axis parallel to the direction of solids flow along the pipe is considered to result in electrical vibrations of the greatest strength.

The described arrangement provides simple but effective means for detecting failure of the flow of coal without introducing into the pipe a large obstruction which might be instrumental in increasing the frequency of flow failure due to blockage of the pipe. Wear of the probe element which it might be feared would limit rather unfavourably the operative life of the probe element has been found to be usually unexpectedly slight, apparently by reason of the formation on the projecting part of the probe element during operation of a protective incrustation derived from the coal.

Instead of or in addition to its employment to effect indication in the event of coal flow failure, the relay may be arranged to control other devices, e.g. hopper or pipe vibrators adapted to promote re-starting of coal flow in case of a blockage. Thus a raw crushed coal hopper supplying the pipe 2 may be provided adjacent its outlet with an electro-magnetic vibration unit normally not supplied with power, but arranged to be supplied with power so as to vibrate the hopper and promote the clearance of blockages in the coal stream from the hopper should the probe unit no longer respond to the flow of coal downwardly past the probe unit.

The described arrangement has been tested with success with streams of coal of different types and of different grades of crushing. It has been found, however, that the strength of vibrations produced is less the smaller the average coal sizing. Since the smaller the coal sizing the less cause for obstruction the probe element presents, a probe element extending a greater distance into the space within the pipe, which will provide increased surface over which moving coal particles may scrape, may be safely and usefully employed for relatively small coal sizings. FIGURES 7 and 8 illustrate a modified probe unit in which the probe element 104 consists of a rectangular mild steel bar 5½" long, 2" wide and 5/16" thick which projects with its axis transverse to the coal stream direction into the interior of the pipe 102 for a distance of 2". The bar is positioned within a mild steel sleeve 106 secured within a mounted flange 107 screw-secured to the wall of the pipe 102 at an aperture 103 therein, in the manner described with reference to FIGURES 1 to 5; the positioning of the bar within the sleeve 106 is effected by an appropriately shaped rubber block 181 which grips by friction one part of the length of one edge of the bar, and a similar rubber block 182, diametrically opposite to the first block within the sleeve 106 which grips a corresponding length of the opposite edge of the bar. A circular rubber disc 183 through a slot in which the bar projects is positioned within the sleeve 106 towards the end thereof nearer to the interior of the pipe in order to prevent the escape outwardly of coal from inside the pipe.

An accelerometer type transducer unit 112 of the kind described with reference to FIGURES 1 to 5 is attached to the bar at an end length thereof projecting outwardly of the sleeve 106, the base of the transducer unit being bedded against a side face of the bar.

The bar is orientated in the probe unit with its side faces parallel to the direction of flow of coal in the pipe 2. The side faces of the end length of the bar projecting into the coal stream provide relatively large surfaces over which coal particles, as the coal stream falls in the pipe, may scrape and thereby set up transverse vibrations in the bar; although the axis of the transducer unit 112 is at right angles to the direction in which these particles move while scraping over the side faces of the probe element (the bar thickness not being sufficient to allow the transducer unit to be readily mounted in any other fashion), the transducer unit generates electrical vibrations of greater amplitude than if the probe element consisted of a round bar projecting only ½" as in the case of FIGURES 1 to 5.

The electrical vibrations from the transducer unit with the arrangements of FIGURES 7 and 8 are led to electrical arrangements, including an amplifier controlling a relay, of the kind described with reference to FIGURE 6. The amplifier should be tuned to an appropriate frequency which may be about 5 kilocycles per second instead of about 3 kilocycles per second as described with reference to FIGURE 6.

I claim:

1. A device for distinguishing between flow and absence of flow of a stream of solid matter through a conduit, comprising, a solid bar projecting through an aperture in the wall of the conduit defining an axis transverse to the direction of flow of solid matter, a sleeve of resilient material supporting said bar in said aperture to reflect mechanical vibration of said bar under the influence of flowing solid matter contacting the same, a tubular housing having an accelerometer type transducing unit mounted therein, said transducing unit being responsive to said mechanical vibrations to establish an electrical signal corresponding thereto, an amplifier for amplifying said electrical signal having a tuned circuit rejecting electrical vibrations other than those at or near a predetermined frequency, and a projection extending from said tubular housing to be received by one end of said bar to support said housing and transducer in axial parallel relationship with the flow axis of the solid matter.

2. A device as claimed in claim 1 wherein the tuned circuit rejects electrical vibrations other than those at or near the frequency of about three kilocycles per second.

3. A device as claimed in claim 1 wherein the amplifier is provided with a time delay element comprising a capacitor which is charged during periods of solids flow and discharges at a predetermined rate following a stoppage of solids flow.

4. A device as claimed in claim 2 wherein the output of the amplifier serves to energize a solenoid during periods of solids flow and after flow stoppage until the charge on the capacitor is reduced to a predetermined point.

References Cited in the file of this patent

UNITED STATES PATENTS

| | | |
|---|---|---|
| 2,229,037 | Boldman | Jan. 21, 1941 |
| 2,568,332 | Genovese | Sept. 18, 1951 |
| 2,659,881 | Bogot | Nov. 17, 1953 |
| 2,693,929 | Greacen et al. | Jan. 4, 1955 |
| 2,879,903 | Payne | Mar. 31, 1959 |

UNITED STATES PATENT OFFICE
CERTIFICATE OF CORRECTION

Patent No. 3,068,694                      December 18, 1962

Bernard A. Worswick

It is hereby certified that error appears in the above numbered patent requiring correction and that the said Letters Patent should read as corrected below.

Column 1, line 24, for "mount" read -- mounting --; line 72, for "elveation" read -- elevation --; column 6, line 42, for the claim reference numeral "2" read -- 3 --.

Signed and sealed this 24th day of September 1963.

(SEAL)
Attest:

ERNEST W. SWIDER
Attesting Officer

DAVID L. LADD
Commissioner of Patents